Figure 1:
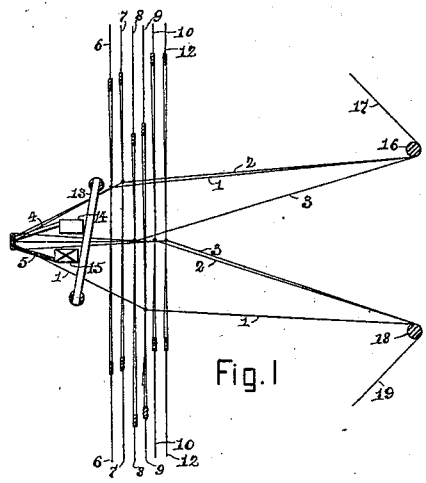

(No Model.) 6 Sheets—Sheet 1.
A. D. EMERY.
METHOD OF WEAVING TWO PLY FABRICS.

No. 415,145. Patented Nov. 12, 1889.

Witnesses— Inventor— Abram D. Emery
by Frank MacArthur
Att'y (No Model.) 6 Sheets—Sheet 2.

A. D. EMERY.
METHOD OF WEAVING TWO PLY FABRICS.

No. 415,145. Patented Nov. 12, 1889.

Witnesses —

Inventor — Abram D. Emery
by Frank Mac Arthur
Att-y (No Model.) 6 Sheets—Sheet 3.

A. D. EMERY.
METHOD OF WEAVING TWO PLY FABRICS.

No. 415,145. Patented Nov. 12, 1889.

Witnesses— Inventor— Abram D. Emery
by
Attorney (No Model.)  6 Sheets—Sheet 4.
A. D. EMERY.
METHOD OF WEAVING TWO PLY FABRICS.
No. 415,145.  Patented Nov. 12, 1889.
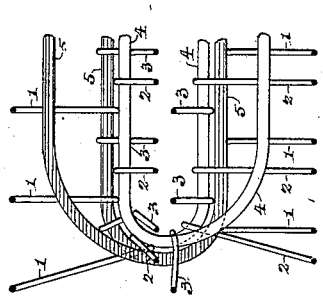
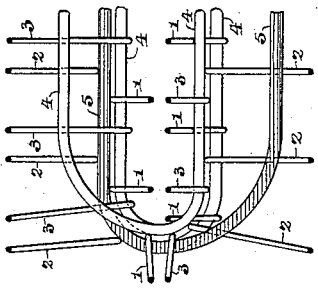
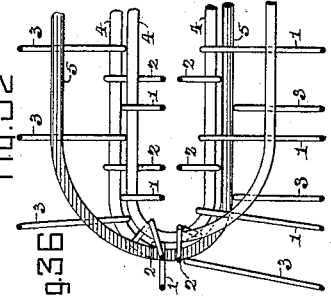
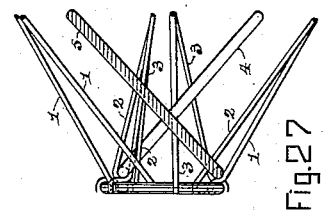
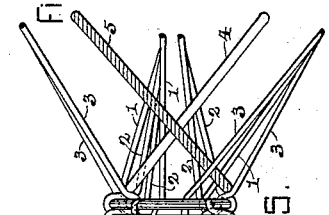
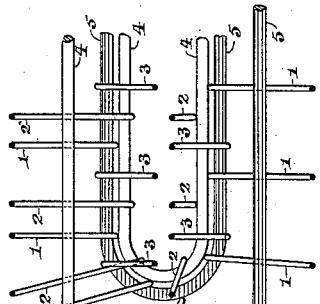
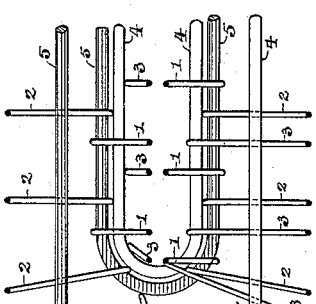
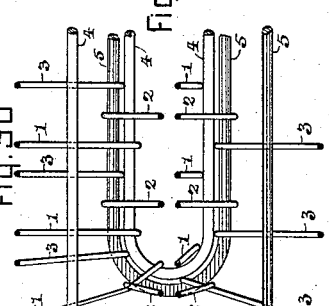
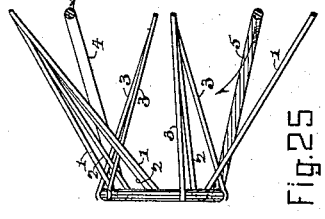
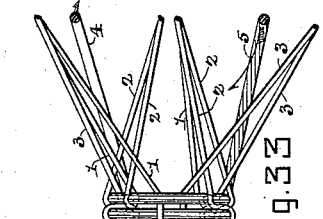
Witnesses—
Inventor— Abram D. Emery
by Frank Mac Arthur
Atty- (No Model.)  6 Sheets—Sheet 5.
A. D. EMERY.
METHOD OF WEAVING TWO PLY FABRICS.
No. 415,145.  Patented Nov. 12, 1889.
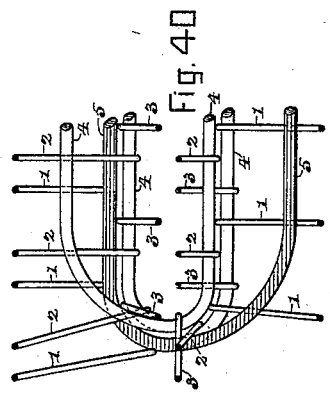
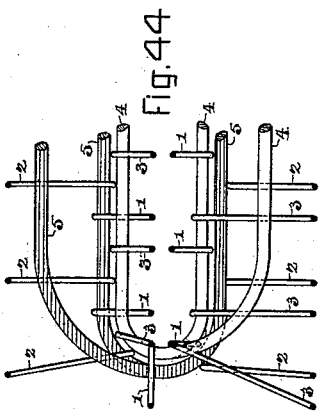
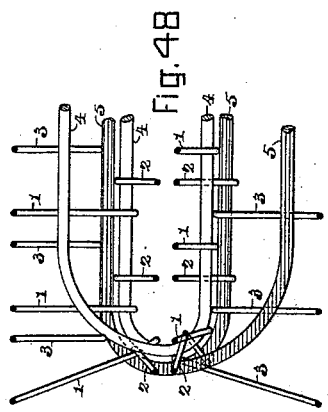
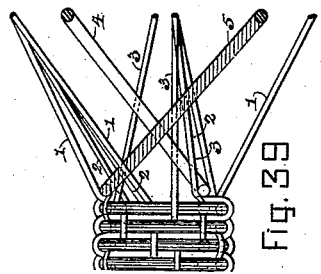
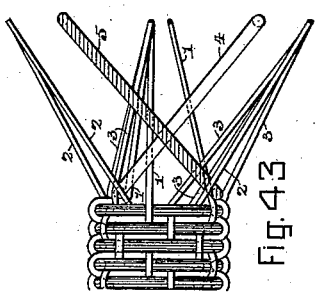
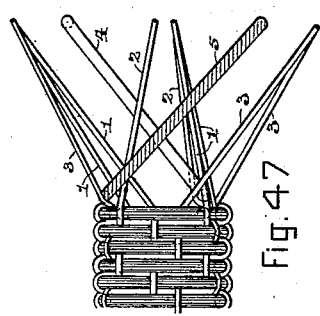
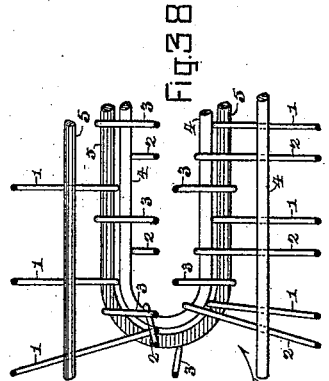
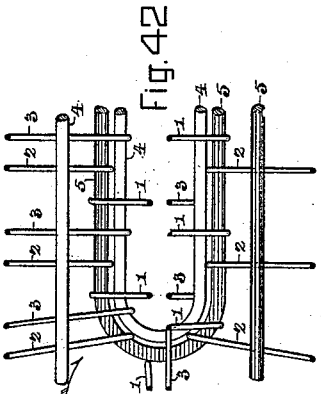
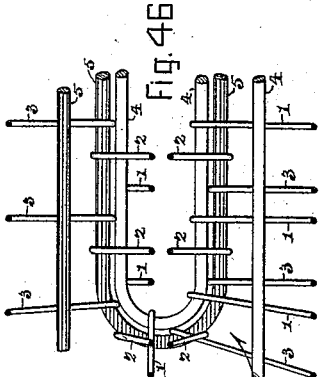
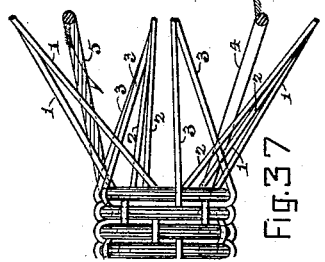
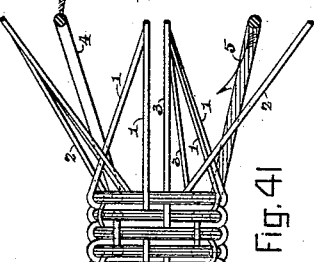
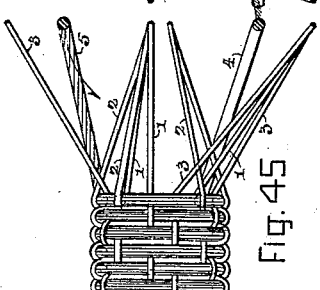

(No Model.)  6 Sheets—Sheet 6.
A. D. EMERY.
METHOD OF WEAVING TWO PLY FABRICS.
No. 415,145.  Patented Nov. 12, 1889.
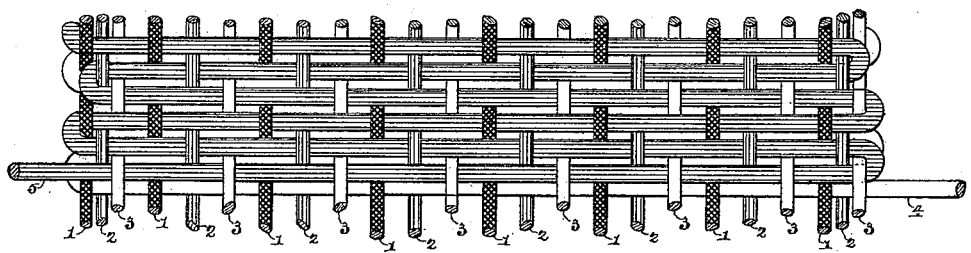
Fig. 49
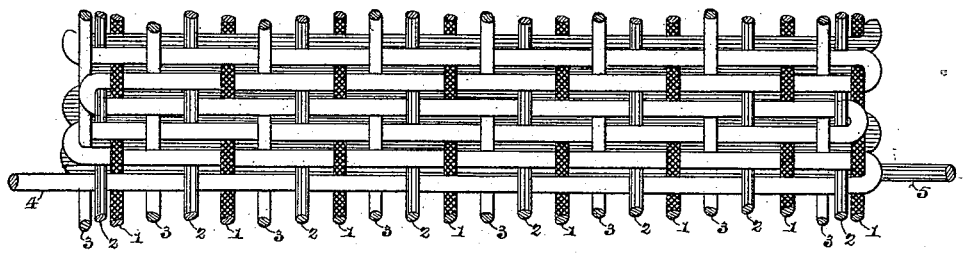
Fig. 50
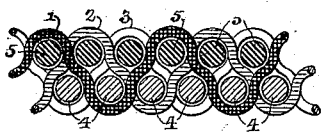 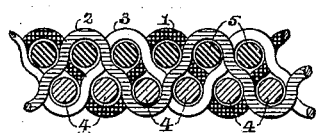 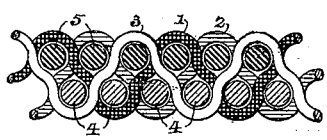
Fig. 51  Fig. 52  Fig. 53
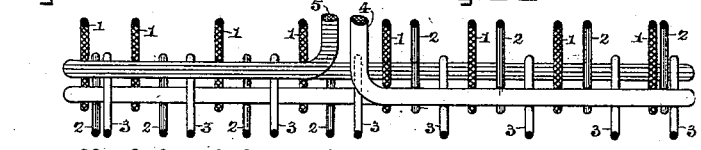
Fig. 54
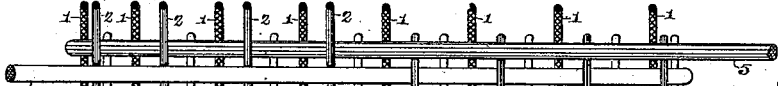
Fig. 55
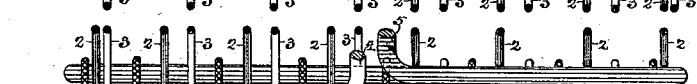
Fig. 56
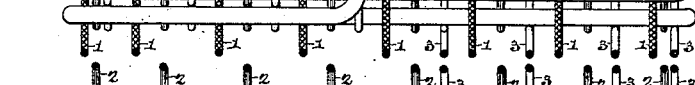
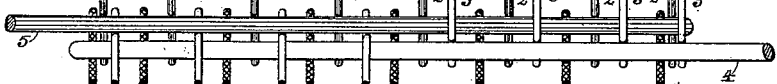
Fig. 57
Witnesses —  Inventor — Abram D. Emery,
  by Frank Mac Arthur
  Attorney —
N. PETERS, Photo-Lithographer, Washington, D. C.

UNITED STATES PATENT OFFICE.

ABRAM D. EMERY, OF TAUNTON, MASSACHUSETTS.

METHOD OF WEAVING TWO-PLY FABRICS.

SPECIFICATION forming part of Letters Patent No. 415,145, dated November 12, 1889.

Application filed March 6, 1889. Serial No. 302,145. (No model.)

*To all whom it may concern:*

Be it known that I, ABRAM D. EMERY, a citizen of the United States, and a resident of Taunton, in the county of Bristol and State of Massachusetts, have invented a certain new and useful Method of Weaving Two-Ply Fabrics, of which the following is a specification.

My invention relates to the art of weaving, and has for its object the production of double-weight or two-ply goods of a width considerably greater than the width of the reed, as more particularly set forth in an application filed by me February 28, 1888, Serial No. 265,639.

The method of weaving as set forth in the application referred to consists in weaving fabrics in two parts side by side in the loom—as, for instance, one above the other—and this result is accomplished, generally speaking, by simultaneously throwing two separate and distinct weft-threads from opposite selvages located on one side of the loom toward the center of the fabric located on the other side of the loom through sheddings prepared for them, there reversing the position of the shuttles and weft-threads, repeating the shedding operation and again introducing the weft-threads, repeating the shedding and returning the weft-threads to the center through the halves just traversed, then again reversing the position of the shuttles and weft-threads, repeating the shedding, and returning the weft-threads to the selvages from which they started. In that application I illustrated my invention in its especial application to the weaving of plain one-ply fabrics.

My present case is designed to cover the application of the same general invention to the production of two-ply fabrics—that is, fabrics in which the face is composed of one weft-thread, which I shall term in this specification for convenience the "face-thread," and the back is composed of another distinct thread, which I shall term the "backing-thread." The variations in the method, therefore, are those only which are necessitated by the peculiarities of the fabric produced.

The distinguishing feature of the method as applied to the weaving of double-weight goods consists in this: that in the weaving of one-ply fabrics the weft-threads are transferred at the center into opposite halves of a succeeding shedding, whereas in the weaving of double-weight or two-ply goods the weft-threads are transferred at the center to opposite parts of the fabric, but continue on to fill the shedding or complete the pick already half-formed by the previous movement.

As was fully described in my former application, the relation of the weft-threads in passing by each other at the center of, over, and under depends upon the fact whether one thread or the other is turned toward the cloth in reversing. It was further explained in that application that the thread which was turned toward the cloth in transferring was thereby placed over the other weft-thread, and that that weft-thread would cross over the other weft-thread in the further passage of the two weft-threads into a succeeding shedding. In the present case, as in that case, the weft-thread which is turned toward the cloth passes over the other weft-thread in transferring; but the further result of crossing one weft-thread over the other does not occur, because the threads in their next passage through the chain-threads do not pass into a succeeding shedding, but continue on to fill or complete the pick already half-formed by the previous movement. As the same thread always passes through the face of the fabric and the same thread always passes through the back of the fabric, it follows that the same thread will always be turned toward the cloth in transferring—that is to say, the face-thread will always be turned toward the cloth in transferring. The fabric as formed in the loom in its folded condition has the face of the top part uppermost and the face of the bottom part outermost and turned down, the back of the fabric in both halves being inside. In short, in the present case I carry simultaneously a face and a back thread each through a portion of the fabric, each thread starting from its own selvage edge and being carried through a shedding made for it in the face or back, as the case may be, toward the center, where the threads are reversed and passed by each other in the manner already explained, the face-thread being caused to pass over a backing-thread and then continued on through the shedding in the face of the opposite half, the backing-thread being simultaneously caused to pass through a shedding in the back of the opposite half of the fabric to that just traversed by it, so that in two picks a face and a backing thread are each carried from one selvage to the selvage on the opposite side, forming one complete layer of weft or one pick in the ordinary sense of the term in the fabric. The movement of the shuttles of course corresponds to this manipulation of the weft-threads. The shuttles start simultaneously from opposite selvages located on the same side of the loom, are driven toward the other side of the loom, where the center of the fabric is formed, are then reversed in position, and each driven to opposite selvages, from which they started. They are then returned to the center, again reversed, and again returned to the selvages from which they started. At each "double half-pick," as it may be termed, or each movement of the two shuttles, a thread is carried through each half of the fabric, one through the face and the other through the back of the fabric. At the next "double half-pick," as it may be termed, or movement of the shuttles—that is, the movement following the transfer of the shuttles—each weft-thread is carried through the opposite part of the fabric and in the face or back in such manner as to complete the line of weft-thread from selvage to selvage. From this description it will be apparent that the sequence of the movements of the weft-threads in the fabric is completed at each fourth movement; but, in consequence of the employment of the necessary number of chain-threads to form a double-weight fabric, the whole sequence of movements necessary to return a thread to its original position in the fabric varies according to the number of chain-threads in each series, as will be hereinafter described.

I have illustrated in the accompanying drawings and will hereinafter describe some of the ways in which my invention may be carried into effect.

Figures 1, 2, 3, 4, 5, 6, 7, 8, 9, 10, 11, and 12 illustrate, diagrammatically, the component parts of the loom, so far as they are essential to the understanding of the invention, arranged to illustrate the twelve sheddings and flights of shuttles which complete the sequence of operations. Figs. 13, 14, 15, 16, 17, and 18 illustrate in cross-section the position of the various threads of the fabric in the corresponding figures on the first and second sheets of drawings as they appear separated and enlarged and at the completion of every second shedding and pick. Figs. 19, 20, 21, 22, 23, and 24 illustrate in cross-section the above-mentioned cross-sections opened out flat, and show the position of the chain and weft threads as they appear in the fabric. Figs. 26, 28, 30, 32, 34, 36, 38, 40, 42, 44, 46, and 48 illustrate in enlarged cross-section the twelve sheddings with the several chain-threads in the position which they occupy at the time of the passage of the weft-threads through them. Figs. 25, 27, 29, 31, 33, 35, 37, 39, 41, 43, 45, and 47 illustrate in enlarged side view the enlarged sheddings, taken from the side upon which the center of the fabric is formed, and show the several threads with relation to each other. Fig. 49 illustrates the face of the completed fabric. Fig. 50 illustrates the back of the completed fabric. Figs. 51, 52, and 53 illustrate cross-sections through the weft-threads of the fabric and the course taken by each of the three chain-threads. Fig. 54 illustrates the first passage of the shuttles from the selvages to the center and the position the threads would occupy in their relative positions in the loom, but opened out flat. Fig. 55 illustrates the second passage of the shuttles from the center to the opposite selvages and the relative positions of the threads. Fig. 56 illustrates the third passage of the shuttles from the selvages to the center and the position of the threads to each other. Fig. 57 illustrates the fourth passage of the shuttles from the center to the selvages from which they started and the relative position of the threads.

For the purpose of facilitating a detailed description of the passage of the weft-threads through the chain-threads and their positions in passing from one portion of sheddings to the succeeding portion one is designated by the numeral 5, and is shown shaded, and will be known as the "face-thread," the backing-thread 4 being shown plain.

Referring now particularly to Figs. 1 to 12, the numerals 1 2 3 indicate the warp-threads arranged in two series of three threads each, each thread being governed by a separate heddle. The chain is divided into two parts, the upper part 17 passing over the whip-roller 16, the lower part 19 passing over the whip-roller 18. The heddle 6 controls the threads of the upper half 17 marked 1, while the heddle 7 controls the threads of the same half marked 2, and heddle 8 the threads marked 3. The heddle 9 controls the threads of lower half 19 marked 1, and heddle 10 those of same half marked 2, and heddle 12 those of the same half marked 3. The chain-threads of both halves are multiples of three, and it is to be understood that the parts marked 1 2 3 represent the position of only one group of a series extending across the loom. Thus the next chain-thread to the third thread would be 1, and so on across the chain.

The numeral 4 represents the unshaded backing weft-thread, and is shown carried by the shuttle 14. The face-thread is represented by numeral 5 and is carried by shuttle 15.

The numeral 13 represents the reed through which the chain-threads pass.

There being one thread of chain over each face and backing weft-thread and one between them at all times, it matters not at what part of the sequence the operation is supposed to begin.

Figure 12:
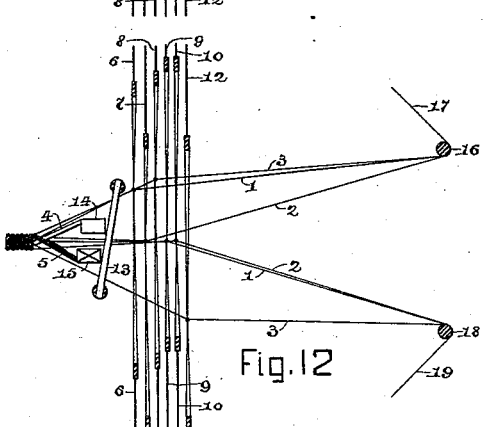
Figure 13:

It is understood that in all references to "over" and "underneath" I refer to the positions of the chain-threads with reference to the face of the fabric as the same will appear when opened out. For the sake of illustration I begin with the first double pick, as shown in Fig. 13, and at the right of the lower half. It will be seen that chain-thread 1 is over the face-thread 5, chain-thread 2 is between face-thread 5 and backing-thread 4, and thread 3 is on back of thread 4, while in the upper half thread 3 is beneath backing-thread 4, thread 2 between 4 and 5, and thread 1 over face-thread 5. To bring about these conditions, reference being had to Fig. 1, heddle 9, carrying threads 1, is depressed, and heddles 10 and 12, carrying threads 2 and 3 of lower chain 19, are raised, the heddle 8, carrying threads 3 of upper chain 17, is depressed, and heddles 6 and 7, carrying threads 1 and 2, are raised. This forms two paths for the passage of the shuttles. The shuttles are indicated as being in the rear of the loom in the stationary boxes, 15 being in the bottom box and 14 in the top, each having attached thereto a separate weft-thread and in position to be driven through to the front. Through these two openings the threads of weft are now passed, the face-thread in the bottom and the backing-thread in the top. This will be seen, also, in the enlarged view, Fig. 26, which is a cross-section of said Fig. 1, and shows thread 5 in bottom shedding, with chain-thread 1 over and 2 and 3 underneath, while thread 4 is in the upper shedding, with thread 3 underneath and threads 1 and 2 over the same. In Fig. 25 will also be seen the threads as shown in Fig. 1, enlarged. In this position they are beaten into the cloth and form what I will designate as the "first double half-pick," and in which it will be seen that two threads of weft have each been carried half-way across the fabric, but in different portions, both as regards the position as to right and left hand side of the fabric and also as to the face and back of same. This will be more clearly seen upon the inspection of the opened-out fabric in course of formation, as illustrated in Fig. 54, where the left-hand part is that formed on the bottom chain 19, Fig. 1, and the right hand that part formed of upper chain 7. The shaded face weft-thread 5 is seen beneath heavy-shaded chain-thread 1. I have in this view shown the chain-threads 1, 2, and 3 in different shadings to better distinguish the one from the other. It will also be seen that the thread 3 lies on the lower side of weft-thread 5, while thread 2 is underneath the previously-laid pick of backing-thread 4. On the right will be seen the backing-thread 4 lying between the chain-thread 3 underneath and threads 1 and 2 over the same. Thus it will be seen that the face-thread 5 fills the face side on the left and the backing-thread fills the bottom side on the right-hand side of the cloth, and in this position they are beaten up into the fabric, with the two weft-threads 5 and 4 projecting out of the same on the face side, which is the front side of the loom upon which the center of the fabric is formed—that is, the side toward the observer in Figs. 1 to 12. It will also be observed that the face of the fabric is formed on the two outsides of the fabric as formed in the loom, while the back is formed of the two insides. The shuttles are now reversed in their positions to occupy the positions shown in Fig. 2 by partial rotation of the shuttle-boxes for holding the same, the shuttle 15, carrying thread 5, being carried toward the cloth to the top, and shuttle 14, carrying thread 4, to the bottom in an opposite direction. The weft-threads are then in position to be thrown into the second single shedding formed by raising heddle 6, carrying thread 1, and depressing heddles 7 and 8, carrying threads 2 and 3 of upper chain 17; and raising heddle 12, carrying thread 3, and depressing heddles 9 and 10, carrying threads 1 and 2 of lower chain 19. The shuttles are then driven to the rear boxes and form a complete passage of both weft-threads from one selvage to the other, and which I will designate as a "double pick."

The position of the threads will be seen in enlarged cross-section, Fig. 28, where is seen thread 5 passing on the outside of the front edge and through the upper shedding, with chain-threads 1 over and 2 and 3 beneath, and the weft-thread 4 passing on the inside or back, with chain-thread 3 underneath and 1 and 2 over the same.

Fig. 27 is a side view of Fig. 28, and shows the position of the threads in their passage from the first double shedding, and shows the face-thread 5 lying over thread 4, due to the manner of passing the thread 5 from bottom to top toward the cloth.

Fig. 55 shows the face-thread 5 continued onto the selvage on the right and completing the face-pick and the backing-thread 4 as continuing onto the selvage on the left, the two completing what I designate one "double pick," there now having been laid two threads from selvage to selvage—one on the face, the other on the back. By examining the chain-threads it will be seen that they follow in regular order across the cloth, all the numeral 1's being over face-thread 5, the 2's between threads 5 and 4, and the 3's underneath the weft or filling thread 4.

The chain-threads will be seen in section in Fig. 13, and correspond in all respects to the positions described hereinbefore, the face-thread 5 being shown as passing from the selvage-threads, which in this view are marked with the numeral 20 to distinguish them from the other threads, and therein are also shown over each other, while in Figs. 54 and 55 they are shown as close together side by side. The backing-thread 4 is shown as passing from the top part of the fabric around the edge on the front on the inside to the bottom rear.

Figure 19:
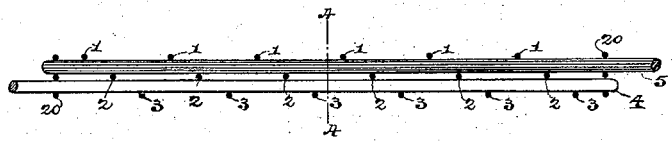

In Fig. 19 is seen a section of the fabric on the line of the first double pick, as shown in Fig. 13, opened out, the lines A A showing the dividing-lines in the two views. The part to the right represents the upper half and that to the left the bottom half. Thus it will be seen that one shuttle has been carried from bottom to top and from selvage to selvage on the outside, while the other has been carried from top to bottom on the inside. If we consider the relative movement of the shuttles with reference to the fabric opened out flat, it will be observed that they have passed by each other in opposite directions at the middle, continuing on in the same direction across the cloth in which they started and always in opposite directions from each other, and that the threads in passing do not cross each other, as they did in my former application. This is due to the fact that they virtually pass on in the same shedding. In other words, the shaded thread, when passing from bottom rear to bottom front, passes between chain-threads 1 and 2, and likewise on its return in the top shedding it is between the threads 1 and 2, while the backing-thread 4 in passing from top rear to top front passes between threads 2 and 3, and likewise in returning from bottom front to bottom rear it passes between 2 and 3.

It is necessary in all cases to transfer the shuttles at the front in the manner described, as a failure to pass the threads by each other at the center in the proper manner will result in forming a cross which will show as a speck of backing-thread on the face of the fabric. The face or shaded thread should always be turned toward the cloth in its passage to the opposite side whether it is in the top or bottom. This is illustrated in Fig. 54, wherein the two threads stand out on the face of the fabric. Here the shaded thread must be passed toward the cloth and the backing-thread away from the cloth to pass the same by each other. Again, the face-thread must be held on the face side and the backing-thread on the backing side of the cloth or underneath the face-thread in order that they may keep between the same threads. This result is accomplished by always turning the face-thread toward the cloth. It will also be observed that the shuttles in passing lay the wefts one over and the other under and into continuations of the same sheddings, while in my previous application referred to the wefts pass side by side and are laid into succeeding sheddings.

Figure 3:
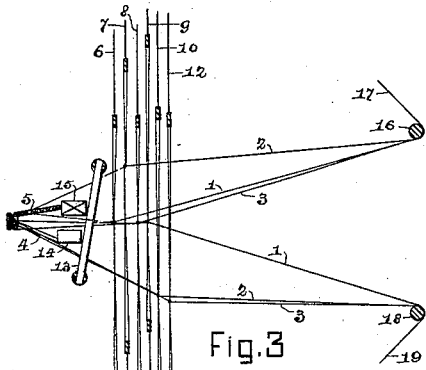
Figure 4:
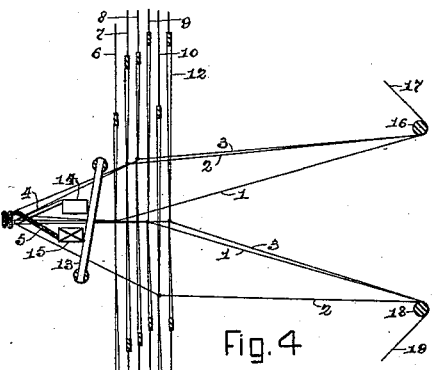

In Fig. 3 the shuttles are shown as having returned from the rear to the front boxes through the same halves of the fabric just traversed. This results from the fact that the rear boxes are stationary, in order to return the weft-threads through the same halves to form the selvage edges. The shedding for the top was previously made by raising heddle 7, carrying threads 2, and depressing heddles 6 and 8, carrying threads 1 and 3 of upper chain 17. The bottom shedding was formed by raising heddle 9, carrying thread 1, and depressing heddles 10 and 12, carrying threads 2 and 3 of chain 19. This is also shown in Fig. 30, wherein will be seen the face-thread 5 in the upper shedding between chain-threads 2 on top and 1 and 3 underneath, and thread 4 in the bottom, with threads 2 and 3 on top and 1 underneath. In Fig. 29 is an enlarged end view of the same, which shows the first double pick beaten up in place and the threads 4 and 5 as extending from the rear to the front between the chain-threads in position forming the two sheddings.

The position that the several threads assume in the opened-out fabric will be seen on examining Fig. 56, wherein the shaded face-thread 5 is shown as extending from the right-hand selvage to the center and lying between the chain-threads 2 over and 1 and 3 underneath, and backing-thread 4 as extending from the left to the center, with chain-threads 1 underneath and threads 2 and 3 over, with the weft-threads 4 and 5 extending out from the fabric. The face side is as before shown in Fig. 54, except that now the face-thread is to the right of thread 4, whereas, as before, it was to the left of the same. This is due to the fact that before it was passing from the left to the right and now it is passing from the right to the left in the fabric. The shuttles being in the front boxes, as shown in Fig. 3, are transferred by turning the top box toward the cloth to the bottom, while the bottom box is carried in an opposite direction to the top. They are shown in their transferred position in Fig. 4, wherein the face-thread is shown as extending from the top to the shuttle in the bottom box and the backing-thread as extending from the bottom to the top box underneath the shaded thread 5. From this position they are passed to the rear through the sheddings formed by raising the heddles 7 and 8, carrying threads 2 and 3, and depressing heddle 6, carrying thread 1 of upper chain 17, and depressing heddle 10, carrying threads 2, and raising heddles 9 and 12, carrying threads 1 and 3 of lower chain 19. The result is shown in enlarged cross-section, Fig. 32, wherein will be seen the backing-thread 4 in the top shedding between the threads 1 on bottom and 2 and 3 on top, and thread 5 in the bottom shedding, with chain-threads 2 over and 1 and 3 underneath and in position to be beaten up into the fabric to finish the second double pick.

Figure 14:
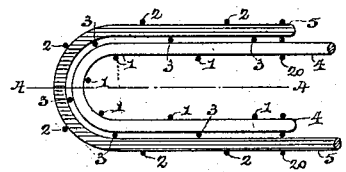
Figure 20:
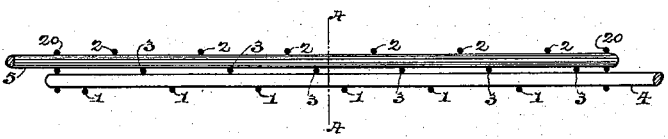

Fig. 31 is an enlarged side view of Fig. 32 and shows the position of the weft-thread 5 as over the thread 4 in passing, and also the position of the chain-threads. The weft-threads are now beaten up in place, as shown in Fig. 14, and complete the second double pick. The sequence of the threads now is 2, 3, and 1, the thread 2 being on top, thread 3 in the middle, and thread 1 at the bottom. It will also be observed that the weft-threads have changed places in the halves of the fabric, thread 4 being in the top and thread 5 in the bottom. In Fig. 20 is shown the fabric in section on the line of the completed second double pick opened out flat, with weft-thread 4 to the right and 5 to the left, just the opposite arrangement of that shown in Fig. 19, but in the initial position from which they were started.

In Fig. 57 is shown the position of the threads in the opened-out fabric, in which the thread 5 is shown as carried from the center to the left-hand selvage, and likewise thread 4 is carried from the center to the right. This completes the sequence of the passage of the shuttles, as they are reversed in position at every second shedding at the front of the loom, so that having made four passages and two reversals they return to their original positions. The sequence of operations, however, is not complete, as the chain-threads have not returned to their original position with reference to the weft-threads—a condition which can only exist at the end of twelve shedding operations.

Figure 5:
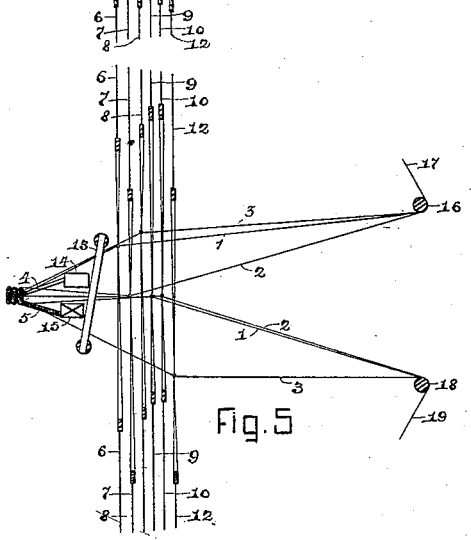
Figure 15:
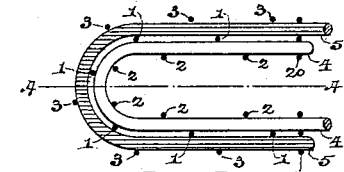

The fifth double shedding is shown in Fig. 5, and is made by raising heddles 6 and 8, carrying chain-threads 1 and 3, and depressing heddle 7, carrying chain-thread 2 of the upper chain 17, and raising heddles 9 and 10, carrying threads 1 and 2, and depressing heddle 12, carrying threads 3 of lower chain 19. The shuttles are then driven from the rear to the front, as shown in the enlarged cross-section, Fig. 34, in which the plain backing-thread 4 is in the top shedding, with chain-threads 1 and 3 over and threads 2 under, and the shaded face-thread 5 is in the bottom part, with threads 3 over and 1 and 2 under. They are now in position to be beaten up into the fabric, of which Fig. 33 is an enlarged side view showing the position of the threads. The relative positions of the threads 4 and 5 are the same as shown in Fig. 54, the face-thread to the left, the backing-thread to the right, constituting what may be termed the "first position" of the second sequence of positions occupied by the weft-threads. The shuttles, being in the front boxes, are transferred by passing the bottom toward the cloth to the top, as in Fig. 2, and they are then driven to the rear boxes through the sheddings shown in Fig. 6, made by raising the heddle 8, carrying the threads 3, and depressing heddles 6 and 7, carrying threads 1 and 2 of the top chain 17, and raising heddle 10, carrying threads 2, and depressing heddles 9 and 12, carrying threads 1 and 3 of lower chain 19. The weft-threads are shown in position in the enlarged cross-section, Fig. 36, in which face-thread 5 is in the top between chain-threads 3 on top and 1 and 2 underneath, while the backing-thread 4 is in the bottom, with threads 1 and 3 over and 2 under. The threads are shown in postion in edge view, Fig. 35, which shows the manner in which the face-thread passes over backing-thread 4, as before described. The two threads are beaten up, as shown in Fig. 15, completing the third double pick, in which the order of the chain-threads is 3, 1, and 2, thread 3 being on top of the face-thread, 1 between the face and backing threads, and thread 2 underneath backing-thread 4. The fabric section on the line of this double pick is shown opened out in Fig. 21, in which the positions of the weft-threads are the same as shown in Fig. 19. This completes the sequence of the chain-threads in this particular application of my invention to the weaving of three-leaf twills. Each set of heddles has been worked over, and the three sets of chain-threads have assumed all the positions in the fabric and are returned to their initial positions. This will be understood by following the threads in the enlarged sections shown in Figs. 51, 52, and 53. Fig. 51 shows the thread 1 in full and its passage. Fig. 52 shows the thread 2, and Fig. 53 shows the thread 3.

Figure 2:
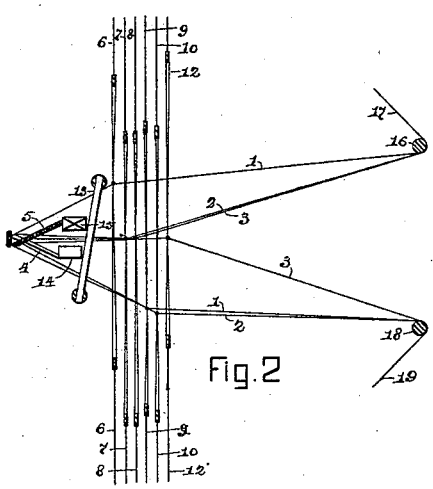
Figure 6:
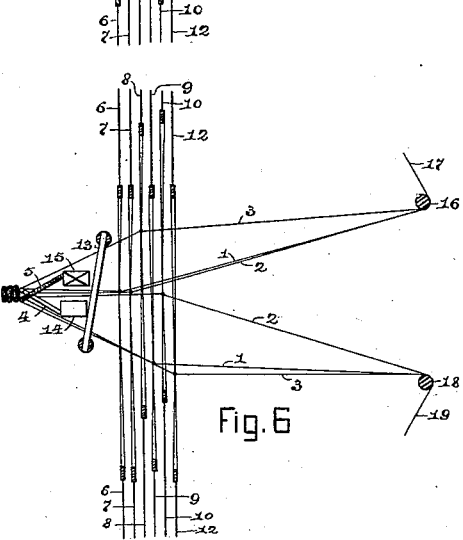
Figure 7:
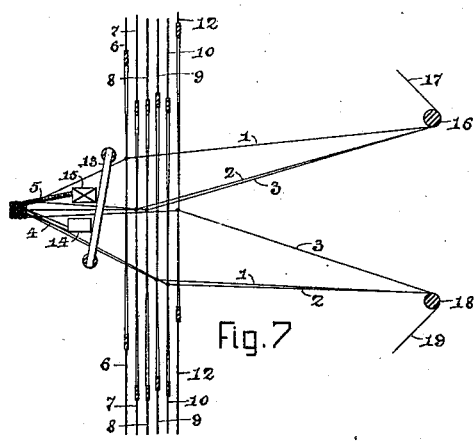
Figure 8:
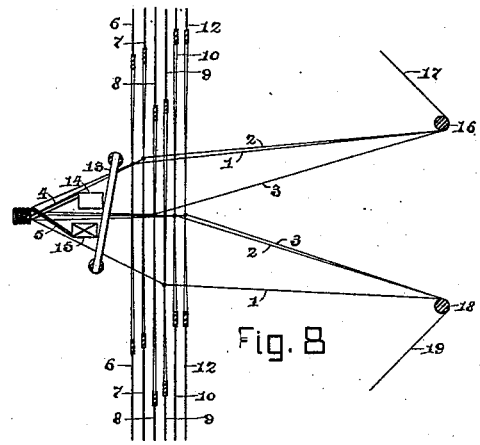
Figure 9:
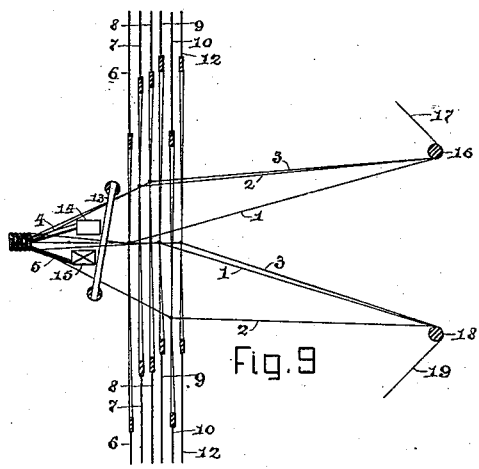
Figure 10:
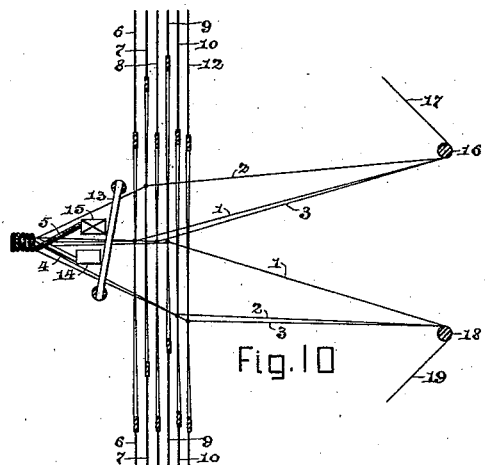
Figure 11:
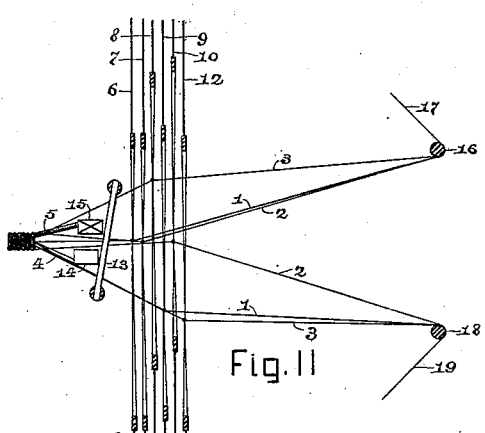
Figure 16:
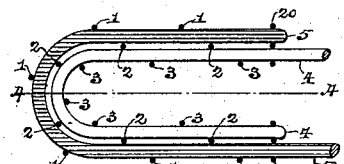
Figure 17:
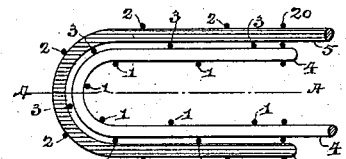
Figure 18:
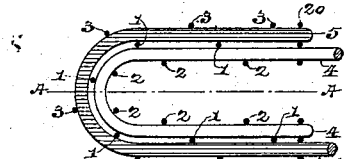
Figure 21:
Figure 22:
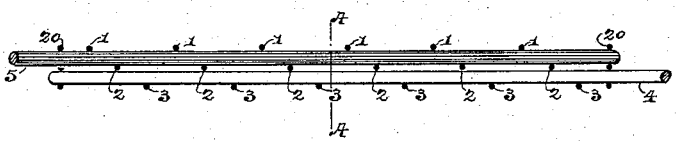
Figure 23:
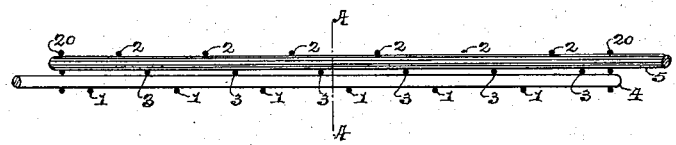
Figure 24:

In Fig. 51 chain-thread 1 is over weft-thread 5 of the first double pick, the same as shown in Figs. 13 and 19, while thread 2 lies between threads 5 and 4 of the first double pick, and thread 3 is underneath thread 4. Thread 1 passes from this position to the back under thread 4 of the second double pick, the same as shown in Figs. 14 and 20, and thence to a position between the threads 4 and 5 of the third double pick, and at the next double pick it will be over the face-thread 5, as in the first double pick. This would complete the sequence of operations were it not for the fact that the sequence of the positions of the weft-threads is not in unison with the sheddings. In beginning to work over the heddles in the regular order, as before, the shuttles are seen to be in opposite boxes from those which they occupied at shedding 1— viz., the shuttle carrying the shaded thread is in the top box upon the completion of the third double pick, as shown in Fig. 6, whereas in shedding 1 it was in the bottom box. To bring the shedding in unison with the shuttles, the sheddings must be worked over for six double sheddings or three double picks— that is, the seventh or first double shedding of the second sequence will be like the second double shedding of the first sequence, it being understood, as before mentioned, that the first and second double sheddings for the first double pick are counterparts of each other in the sense that in both sheddings the weft-threads are placed in the same positions in the fabric, except that they are in opposite halves. In other words, Fig. 1 shows a shedding for face-thread on bottom and backing-thread on top, and Fig. 2 is for face-thread on top and backing-thread on bottom. Now, at the seventh double shedding, or at the beginning of the fourth double pick, the face-thread is on top at the rear of the loom, and the backing-thread is at the bottom at the rear of the loom. Thus the seventh shedding will be similar to the second, and is shown in Fig. 7, as well as in Figs. 38 and 37. The next shedding (see Fig. 8) will be like Fig. 1, and is also shown in Fig. 40 and edge view, Fig. 39. The passage of the shuttle through this double shedding will complete the fourth double pick, as shown in Fig. 16 and as opened out in Fig. 22, in which the warp-threads are in the same position, as well as the weft threads contained between them, except that the weft-threads are extending from opposite selvages. The ninth double shedding, as shown in Fig. 9, and also shown in enlarged view, Figs. 42 and 41, is similar to fourth shedding, Fig. 4. The tenth double shedding, as shown in Fig. 10 and enlarged views, Fig. 44, and edge view, Fig. 43, is similar to the third double shedding, as shown in Fig. 3. The passage of the shuttles through this double shedding completes the fifth double pick, as shown in Figs. 17 and 23, which is like the second double pick as shown in Figs. 14 and 20. The eleventh double shedding, as shown in Fig. 11 and in enlarged views, Figs. 46 and 45, is similar to the sixth single shedding, as shown in Fig. 6. The twelfth double shedding, as shown in Fig. 12 and in enlarged views, Figs. 47 and 48, is similar to Fig. 5. The passage of the shuttles through this double shedding completes the sixth double pick, as shown in Figs. 18 and 24, which is like the third double pick, as shown in Figs. 15 and 21. The sequences of the sheddings and the shuttle-threads are now in unison. The shuttles are in the initial position at the completion of every second double pick, and the several positions of the weft-threads must come to an initial position in unison with the initial position of the weft-threads, or must be worked over in an inverse order to bring them in unison. The several positions of the heddles must be divisible by two. Thus a four-leaf twill would need to be worked over once, making four double picks, while a five-leaf twill would require to be worked over twice, making ten double picks. The odd twills require to be worked over twice and the even number only once; or, in other words, the several positions from and to an initial position must be a multiple of two.

The finished fabric is shown in Figs. 49 and 50, Fig. 49 showing the face side and Fig. 50 the back of the same.

In Figs. 51, 52, and 53 are shown the several positions assumed by the chain-threads in their passage through the fabric, where it will be seen that they all assume the same position both in their passage from face to back and back to face.

It is understood, of course, that the weft-threads may be of the same or different colors or quality, as desired. The face-thread of course shows only on the face, and can, if desired, be of a finer grade than the backing-thread; or otherwise, if desired, both weft-threads may be of the same quality, thereby making an extra-heavy piece of goods.

The fabric formed as described is a regular three-leaf twill, both sides being exactly alike so far as the figure is concerned, and, in fact, if both weft-threads are of the same quality and color the two sides will be exactly alike in all respects.

What I claim as my invention is—

1. The improved method of weaving two-ply fabrics, which consists in simultaneously forming an opening or shed in each of the two halves of a single set of chain-threads— one shed for the face-thread and the other shed for the backing-thread—then simultaneously introducing a weft-thread into each of the openings or sheds so formed from the selvage sides thereof toward the center, then repeating the shedding operation, shedding for the face the half of the warps previously shed for back, and vice versa, and again introducing the weft-threads and carrying each of the latter through the half of the chain-threads just traversed by the other.

2. The improved method of weaving two-ply fabrics, which consists in simultaneously forming an opening or shed in each of the two halves of a single set of chain-threads— one opening for the face-thread and the other opening for the backing-thread—then simultaneously introducing a facing and backing thread into each of the openings or sheds so formed from the selvage sides thereof toward the center, then repeating the shedding operation, shedding for face in that half of the chain-threads just shed for back, and vice versa, and in such manner that there will have been formed a continuous opening from selvage to selvage for the face and backing threads, respectively, and again introducing the weft-threads and carrying each through its respective opening or shedding.

3. The improved method of weaving two-ply fabrics, which consists in forming simultaneously in the chain-threads two openings or sheds side by side—one for a face-thread and one for a backing-thread—then simultaneously introducing a facing and backing thread each into its respective opening or shed and from the same side of the loom, then repeating the shedding operation and forming a continuation in the opposite halves of the chain-threads of the openings already formed for the face and backing threads, respectively, and again introducing the weft-threads, carrying each of the latter through its respective opening or shed.

4. The method of weaving two-ply fabrics, which consists in forming simultaneously in the chain-threads two openings or sheds side by side—one shed in one half for a face-thread and the other shed in the other half for a backing-thread—then passing a face-thread and backing-thread through said openings or sheds, then repeating the shedding operation and forming openings for the face and backing threads, each in the opposite half of the chain-threads from that just traversed by them, respectively, and in continuation of the first openings formed for them, then reversing the position of the weft-threads with relation to the two halves of the fabric, carrying the face-thread over the backing-thread by passing the same next the cloth, again introducing the weft-threads, and carrying each through its respective opening to complete an insertion of weft extending from selvage to selvage.

5. The improved method of weaving two-ply fabrics, which consists in simultaneously forming two openings or sheds in the chain-threads side by side—an opening for the face-thread in one half and an opening for the backing-thread in the other half—then simultaneously introducing a weft-thread into each of the openings or sheds from the same side of the loom, then simultaneously forming two openings or sheds in the chain-threads, as before, to complete the pick, these latter openings being continuations of the openings first formed, then reversing the position of the weft-threads with respect to the two halves of the chain-threads, carrying the face-thread over the backing-thread by passing the same next the cloth, and again introducing the weft-threads, thus completing the passage of the two weft-threads from selvage to selvage through the face and back of the fabric, respectively.

6. The improved method of weaving two-ply fabrics, which consists in simultaneously forming two openings or sheds in the chain-threads side by side—an opening for a face-thread in one half and an opening for a backing-thread in the other half—then simultaneously introducing a weft-thread into each of said openings or sheds from the same side of the loom, then repeating the shedding operation and forming a continuation in each of the opposite halves of the chain-threads of the opening previously formed in the first half, reversing the position of the weft-threads on that side of the loom, carrying the face-thread over the backing-thread by passing the same next the cloth and again introducing the weft-threads, each traversing the portion of the chain-threads just traversed by the other and in the opening which forms a continuation of the opening first traversed by it, repeating the shedding operation and returning the weft-threads in the same portion of the chain-threads just traversed, each weft-thread passing through the face and back, as before, repeating the shedding operation and forming an opening for the face-thread in the face of the half of the chain-threads just traversed by the backing-thread, and, vice-versa, again reversing the position of the weft-threads, and, finally, returning the weft-threads through the portion of the chain-threads just traversed, thereby forming the two selvages on one side of the loom and the center of the fabric on the other.

7. The improved method of weaving two-ply fabrics, which consists in forming simultaneously two openings or sheds in the chain-threads side by side—an opening for a face-thread in one half and an opening for a backing-thread in the other half—then simultaneously introducing a weft-thread into each of said openings or sheds from the same side of the loom, then repeating the shedding operation and forming a continuation in each of the opposite halves of the chain-threads of the opening previously formed in the first half, reversing the position of the weft-threads, carrying the face-thread over the backing-thread on that side of the loom and again introducing the weft-threads, each traversing the portion of the chain-threads just traversed by the other and in the opening which forms a continuation of the opening first traversed by it, repeating the shedding operation and returning the weft-threads in the same portion of the chain-threads just traversed, each weft-thread passing through the face and back, as before, repeating the shedding operation forming an opening for the face-thread in the face of the half of the chain-threads just traversed by the backing-thread, and, vice versa, again reversing the position of the weft-threads, and, finally, returning the weft-threads through the portion of the chain-threads just traversed, and continuing the flight of the shuttles in the order described until the sequence of the movements of the shuttles coincides with the sequence of the movements of the chain-threads.

Signed at Taunton, in the county of Bristol and State of Massachusetts, this 4th day of February, A. D. 1889.

ABRAM D. EMERY.

Witnesses:
WM. T. DONNELLY,
WALTER T. EMERY.